United States Patent [19]

Bass

[11] 4,171,792
[45] Oct. 23, 1979

[54] HIGH PRESSURE DIAPHRAGM VALVES

[75] Inventor: Harold E. Bass, Pineville, La.

[73] Assignee: Dresser Industries, Inc., Dallas, Tex.

[21] Appl. No.: 784,200

[22] Filed: Apr. 4, 1977

Related U.S. Application Data

[63] Continuation-in-part of Ser. No. 535,865, Dec. 23, 1974, abandoned.

[51] Int. Cl.² .................................................. F16K 31/50
[52] U.S. Cl. ............................... 251/335 A; 251/214; 251/225
[58] Field of Search .............. 92/98 R, 103 R, 103 M, 92/104; 138/39; 251/214, 215, 216, 217, 218, 219, 220, 221, 222, 223, 224, 225, 226, 227, 319, 320, 321, 322, 323, 335 A

[56] References Cited

U.S. PATENT DOCUMENTS

| | | | |
|---|---|---|---|
| 556,702 | 3/1896 | Snow | 92/103 M |
| 1,316,585 | 9/1919 | Logan | 251/335 A |
| 1,466,243 | 8/1923 | Neal | 92/103 M |
| 1,497,275 | 6/1924 | Hench | 251/335 A |
| 1,695,534 | 12/1928 | Carter | 92/103 R |
| 1,732,052 | 10/1929 | Joyce | 92/98 R |
| 1,749,774 | 3/1930 | McKay | 251/335 A |
| 1,826,158 | 10/1931 | Valmore | 251/335 A |
| 1,843,068 | 1/1932 | Von Wangenheim et al. | 92/103 M |
| 1,910,994 | 5/1933 | Joyce | 251/335 A |
| 2,061,028 | 11/1936 | Forbes et al. | 251/335 A |
| 2,241,056 | 9/1941 | Chilton | 92/104 |
| 2,388,046 | 10/1945 | Emrich | 251/335 A |
| 2,507,851 | 5/1950 | Bryant et al. | 251/215 |
| 2,642,255 | 6/1953 | Lindgren | 251/335 A |
| 2,665,105 | 1/1954 | Svabek, Jr. | 251/335 A |
| 2,704,548 | 3/1955 | Ralston | 92/103 |
| 3,295,856 | 1/1967 | Bredtschneider | 251/214 |
| 3,874,636 | 4/1975 | Bake et al. | 251/335 A |

FOREIGN PATENT DOCUMENTS

| | | | |
|---|---|---|---|
| 224528 | 8/1922 | Fed. Rep. of Germany | 138/39 |
| 2415299 | 4/1973 | Fed. Rep. of Germany | 251/335 A |
| 29625 | 9/1925 | France | 251/335 A |
| 65321 | 7/1944 | Netherlands | 251/335 A |
| 27477 | of 1902 | United Kingdom | 138/39 |

Primary Examiner—William R. Cline
Assistant Examiner—H. Jay Spiegel
Attorney, Agent, or Firm—Daniel Rubin

[57] ABSTRACT

A globe type Y-pattern diaphragm valve for high pressure, high temperature service affording increased diaphragm cycle life, enhanced flow coefficient and features of decreased construction cost. Comprising the diaphragm in one embodiment is a resiliently supported multi-layer cartridge formed of superimposed layers of different metals having different moduli of elasticity with the upper layers being radially slotted to redistribute encountered stress loads. In an alternate embodiment the multi-layer diaphragm cartridge is comprised of superimposed layers of like composition but of varying relative thicknesses and supported to afford a controlled flexure. An auxiliary porting in the discharge passage adjacent the valve head in combination with a downstream tapered and faired beltway effects a more nearly streamlined flow path to increase the flow coefficient rating of the valve. By means of a multi-purpose packing gland identically threaded both inside and out, the gland is able to also function as a stem bushing enabling a comparatively inexpensive bar stock bonnet construction to be employed.

35 Claims, 14 Drawing Figures

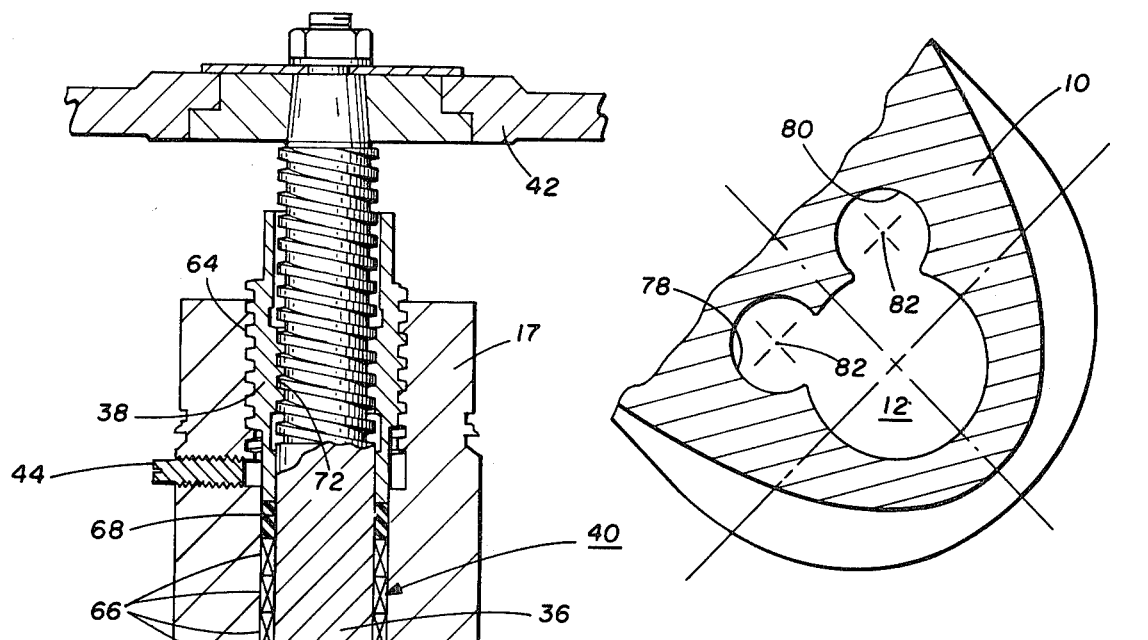
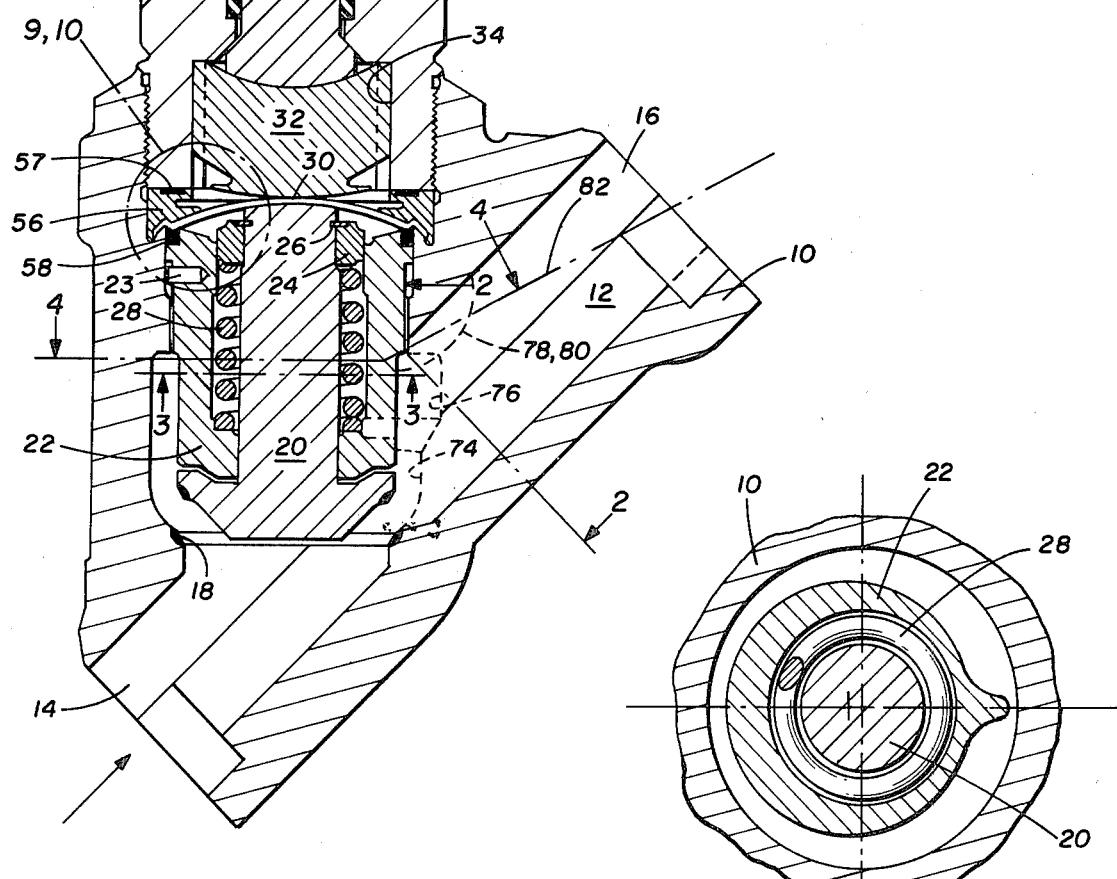
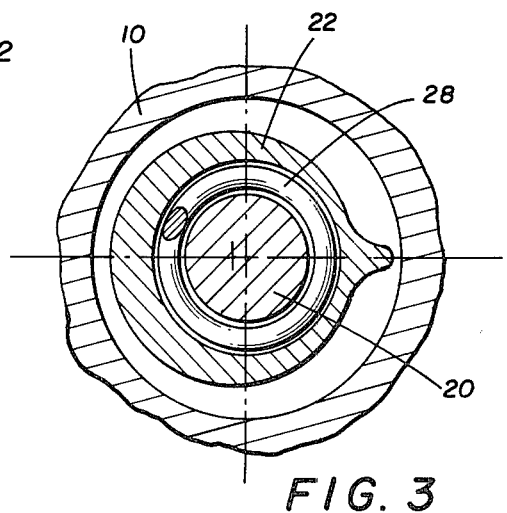
FIG. 1
FIG. 2
FIG. 3

HIGH PRESSURE DIAPHRAGM VALVES

CROSS REFERENCE TO RELATED APPLICATIONS

This is a continuation-in-part of application Ser. No. 535,865 filed Dec. 23, 1974, now abandoned.

BACKGROUND OF THE INVENTION

1. The field of art to which the invention pertains includes the art of valves and particularly to diaphragm-type valves for high pressure, high temperature line service.

2. The need for reliability against stem or bonnet leakage in an in-line valve is known to increase in correlation with the pressure and temperature service for which the valve is to be used. When operating under severe service conditions on the order of 2000 p.s.i. and 650° F., it is common to use either a bellows-seal construction or a multi-layer diaphragm construction in combination with stem packing in order to prevent line leakage past the stem cavity. Of the two, the bellows seal construction is usually the more costly by a significant margin. Contributing to lower cost of the diaphragm valve is the usual employment of a relatively uncostly globe valve body arrangement able to readily accommodate lift limitations associated with the diaphragm and constructed preferably in a Y-pattern to enhance flow characteristics. Conventional globe type Y-pattern valves of this type are available from a variety of commercial sources. A disclosure of the latter construction is contained in U.S. Pat. No. 3,874,636.

While the diaphragm valve has enjoyed a high order of commercial success, one characteristic deficiency has been the relative short life expectancy under severe operating service of the diaphragm per se to on the order of 500–3000 open and closing cycles. This is generally attributed to the variety of stresses imposed under pressure against the diaphragm in being flexed between open and closed positions of the valve. With each complete open and closing cycle, at least the central portion of the diaphragm incurs a reverse shaping distortion between convex to concave as the valve disc is moved toward and away from seating relation tending to cause such wear phenomena as buckling, creasing, fatigue, etc. Should diaphragm failure be detected, it is customary to shut down operation in order to effect a maintenance replacement therefor, but if undetected only the stem packing remains as a deterrent to leakage. With the advent of nuclear service to replace fossil fuel for power generation, the increased operational severity and maintenance difficulties has rendered it increasingly imperative to hold operational shutdown to a minimum. As a consequence, valve standards for some nuclear services now require that the diaphragm have a minimum life expectancy of at least about 12,000 cycles. This standard, of course, far exceeds prior art capability and despite recognition of the problem a suitable construction able to conform with the requirement has not heretofore been known.

Provided as a backup to prevent leakage in the event of diaphragm failure in these valves is the packing compressed in the bonnet base about the valve stem. In the usual construction to effect adequate pack there is included a packing gland, gland flange, gland bolts, nut, etc. employed in combination with a forged or cast bonnet yoke. While the high cost attributed to this assembly combination has long been known, it has heretofore been unknown how to significantly reduce costs without sacrificing the quality and reliability that this construction has afforded.

At the same time, diaphragm valves of the type contemplated herein, particularly in sizes 2 inches and greater typically imposed highly complicated, confined and multi-directional flow patterns past the valve disc. Because lift dictated by use of a diaphragm is relatively small, a larger than normal seat diameter is required to obtain the necessary flow area. This in turn causes the flow path to incur a sharper than normal bend in and about the seat contributing to a high pressure loss and consequently a lower than desirable coefficient of flow (Cv). A 2-inch full ported valve of this type usually has a Cv in the range of about 40–60. Despite various approaches to the problem these valves have been generally unable to further increase the capacity rating beyond an upper limit of about 60.

SUMMARY OF THE INVENTION

This invention relates to Y-pattern diaphragm valves intended for high pressure, high temperature service and particularly to specific improvements to enhance performance and cost factors for such valves. More specifically, the invention relates to various improvements including the diaphragm for achieving an extended cycle life able to meet current requirements as to overcome the previous limitation in similar purpose valves of the prior art. At the same time, a specific form of auxiliary relief in the discharge flow passage substantially straightens the flow path in order to exceed previous limits on flow coefficients. Yet further there is provided a substantially less costly bonnet and packing construction than normally associated with similar valves of the prior art.

The foregoing is achieved in accordance herewith by means of a laminated construction comprising a resiliently supported multi-layer clamped cartridge which in one embodiment at least some of the superimposed layers are of different metals having selectively different moduli of elasticity. At least the uppermost layer is controllably slotted to redistribute cycle encountered stress loads while the upper support foundation bearing edges are sufficiently resilient to avoid sharp stress discontinuities thereat. In an alternate embodiment, the individual layers are of a like metal composition but of varying relative thickness and supported to afford a controlled flexure.

Enhanced flow characteristics are obtained by an auxiliary porting in the downstream discharge passage adjacent the valve head in combination with a tapered and faired beltway to effect a more nearly streamlined flow path in providing a gradually changing flow area and thereby significantly reduce the head losses previously encountered. By means of a multi-purpose packing gland identically threaded both inside and out, the bonnet is capable of being constructed of bar stock material eliminating the relatively more complex and costly assembly of components presently utilized.

It is therefore an object of the invention to provide improvements in a diaphragm valve for high pressure, high temperature service.

It is a further object of the invention to effect improvements in a high pressure, high temperature diaphragm valve affording significantly increased cycle life for the diaphragm per se.

It is a further object of the invention to provide improvements in a diaphragm valve for enhancing the flow coefficient therefor.

It is a further object of the invention to afford an improvement to a diaphragm valve rendering it able to utilize a substantially lower cost bonnet construction as compared to similar purpose valves of the prior art.

It is a still further object of the invention to achieve the foregoing objects in a globe type Y-pattern diaphragm valve without incurring costly changes which detract from the economic advantages that such valves have in competition with the bonnet seal valve for comparable service conditions.

BRIEF DESCRIPTION OF THE DRAWINGS

FIG. 1 is a sectional elevation of a Y-pattern diaphragm valve in accordance herewith;

FIG. 2 is a sectional view taken substantially along the lines 2—2 of FIG. 1;

FIG. 3 is a sectional view taken substantially along the lines 3—3 of FIG. 1;

Figure 4:
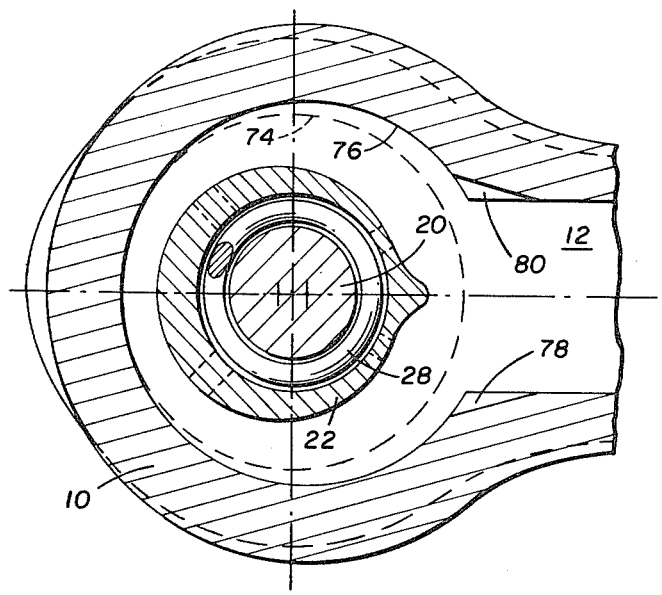
FIG. 4 is a sectional view taken substantially along the lines 4—4 of FIG. 1.
Figure 5:
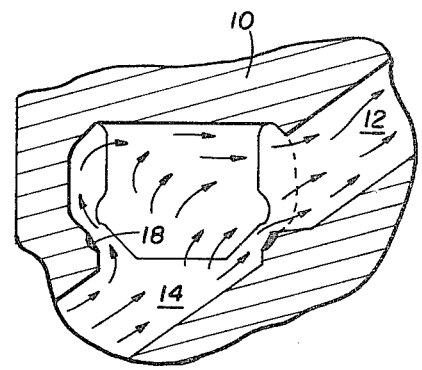
FIGS. 5 and 6 are sectional elevations and plan, respectively, illustrating the flow pattern for valve sizes 1 inch and smaller.
Figure 7:
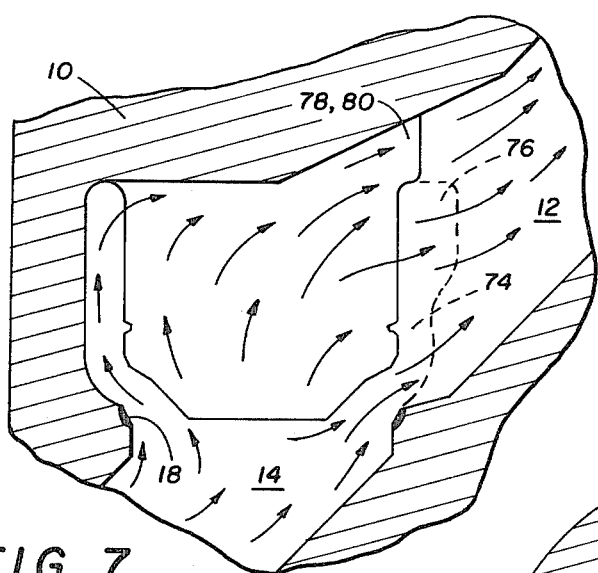
FIGS. 7 and 8 are flow patterns similar to FIGS. 5 and 6 for valve sizes of 1½ inch and larger.
Figure 6:
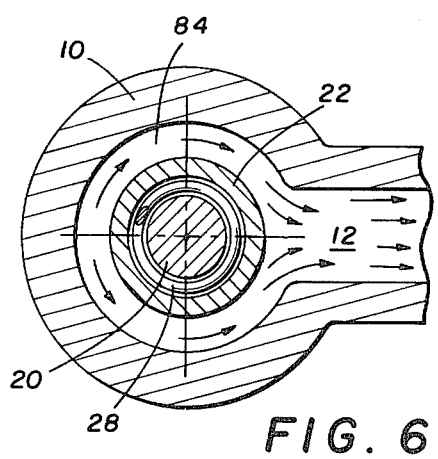
Figure 8:
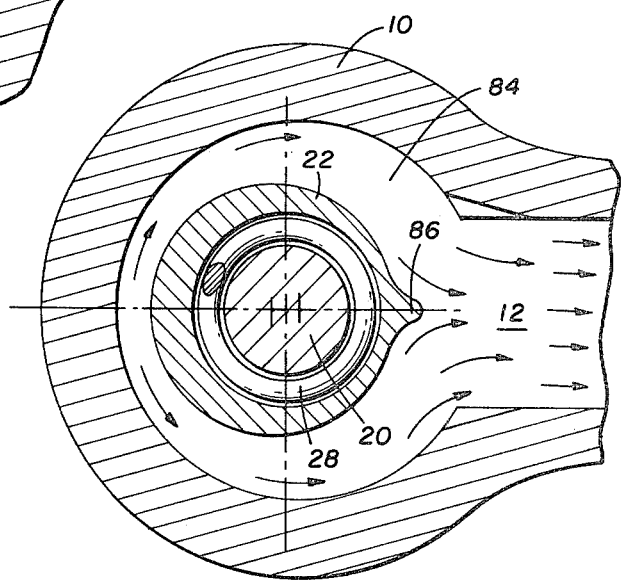

Referring initially to FIG. 1, there is illustrated a globe type Y-pattern diaphragm valve in accordance herewith comprising a body 10 defining a flow passage 12 between an inlet 14 and an outlet 16 and supporting a bonnet 17 threadedly connected thereto. Defined at an intermediate location in passage 12 is a hard annular alloy seat 18 of Stellite or the like with which a valve disc 20 cooperates for opening and closing the passage to fluid flow. As illustrated, disc 20 is shown in open position supported within a tubular guide 22 secured and aligned in the body via a pin 23 while a surrounding cap 24 secures the disc via a retaining ring 26. Compressed about the disc between the disc cap and guide is a coiled spring 28 acting to urge disc 20 upward toward open position against the underside of a laminated diaphragm 30. Downwardly operable on the top side of the diaphragm 30 as to oppose spring 28 for urging disc 20 into closed position against seat 18 is a steam head 32 of hexagonal periphery slideably contained in hexagonal bore 34 at the underside of bonnet 17.

For operating the valve between open and closed positions, there is provided a stem 36 extending centrally outward through the bonnet from a position engaging the top inwardly dished top side of head 32. A gland nut 38 secured about the stem extending to interior of the bonnet serves to compress packing 40 while threadedly supporting stem 36. In this arrangement, rotation of hand wheel 42 in one direction forces head 32 and disc 20 toward seating relation for closing passage 12 and when rotated in the opposite direction enables line pressure in combination with spring 28 to raise disc 20 and head 32 upwardly for opening the passage to fluid flow.

Diaphragm 30 in accordance with a first embodiment hereof will now be described with particular reference to FIGS. 9-12 from which it can be seen that the diaphragm comprises a cartridge formed of a plurality of superimposed layers 46 and 48 that are usually prepacked and dry lubricated with molybdenum disulphide or the like to permit some sliding movement therebetween. Each of the layers consists of a high strength spring grade metal in thicknesses on the order of 0.005–0.015 inches able to provide maximum flexibility while retaining sufficient strength to avoid shell type cross-buckling which might otherwise occur. The layers are slightly dished and clamped at their edges to accommodate a valve stroke limited to less than pop-through deflection. Collectively, the diaphragm stack should have sufficient inherent strength to support internal valve pressure. By means of radial slots 50 angularly spaced through the surface of top layer 46, that layer is essentially converted from a shell action to a simple beam for reasons as will be more fully described below. Depending on load factors, slots 50 may be in more than one of the top layers, and an angular displacement between slots 50 of about 30 degrees has been found suitable for that purpose.

Figure 9:
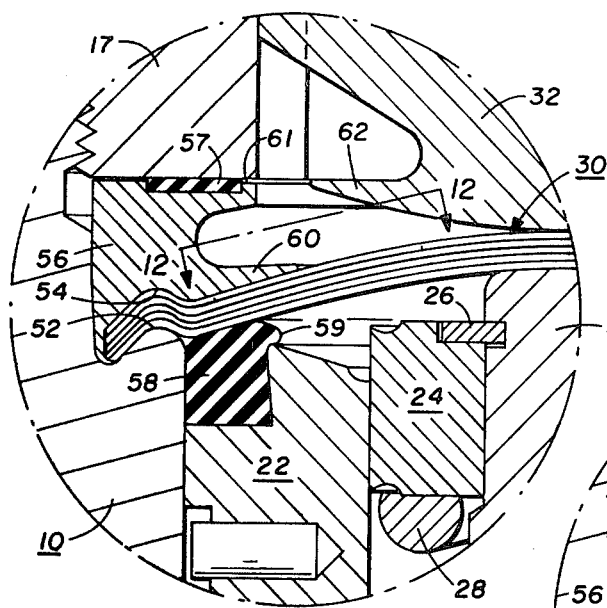
FIG. 9 is a fragmentary sectional enlargement of the encircled portion of FIG. 1 with the valve in its open position.
Figure 10:
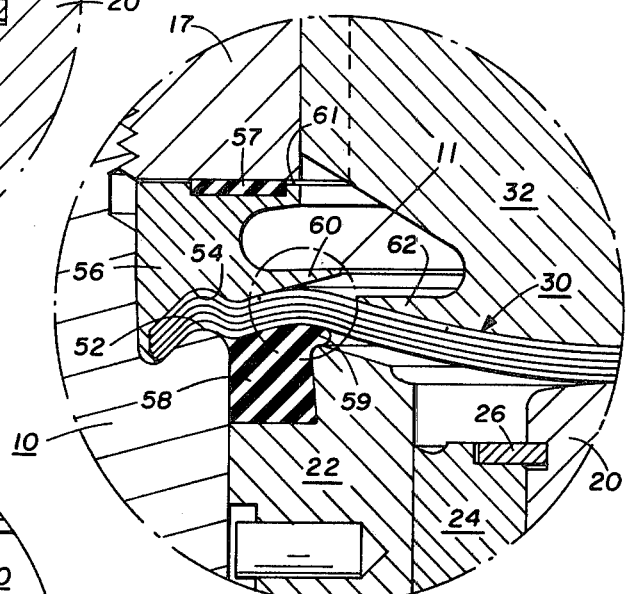
FIG. 10 is a fragmentary sectional enlargement of the encircled portion of FIG. 1 with the valve in its closed position.
Figure 11:
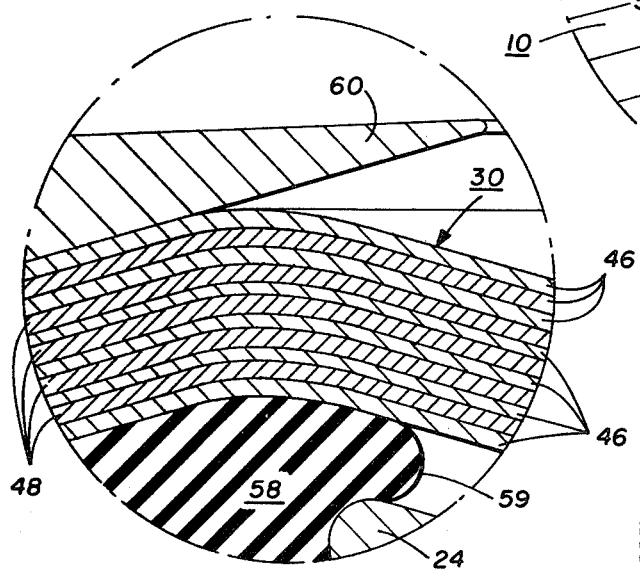
FIG. 11 is a fragmentary further enlargement of the encircled portion of FIG. 10.
Figure 12:
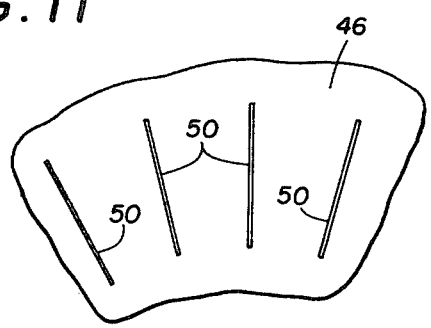
FIG. 12 is a fragmentary plan view as seen substantially along the lines 12—12 of FIG. 9.

In a preferred embodiment, layers 46 are about 0.008 to 0.012 inches in thickness and consist of Inconel 718 being a trademark of Huntington Alloy Co. for a high nickel chromium alloy having a modulus of elasticity of about $30 \times 10^6$ p.s.i. Preferably, layers 48 are about 0.010 to 0.015 inches in thickness and consist of titanium 6 Al4V being a highly stable titanium, aluminum, vanadium alloy of light weight corrosion resistant properties having a modulus of elasticity of about $16 \times 10^6$ p.s.i. Beginning at the underside of the diaphragm for valves of 1½ inch and larger, the first eight layers as seen in FIG. 9, alternate between materials 46 and 48 whereas the upper layers are all of the same material 46. By alternating the layers in this manner, the low modulus element 48 remains well within elastic stability throughout the valve cycle whereas the high modulus element 46 carries disproportionate higher loading as it approaches a local buckling condition against which it is restrained by the adjacent layers.

For supporting the diaphragm stack in order to minimize or eliminate uneven cycle strain as might otherwise occur, the stack is gripped about its edges in a smoothly contoured reverse curve between an upwardly extending annular body tongue 52 and a recess groove 54 in the underside of annular retainer 56. Retainer 56 is in turn secured in that relation and includes a gasket 57 which with flexible ledge 61 maintains a pressure seal against the underface of bonnet 17. Radially inward of the reverse curve the underside of the stack engages a resilient support pad 58 which also serves to isolate the stack from contact with guide 22. Concomitantly therewith, the stack top side is engaged outwardly by tapered and relatively flexible thinning support flange 70 extending inwardly from retainer 56 and is engaged centrally by a tapered relatively flexible and thinning support flange 62 on head 32. In a preferred construction, both pad 58 and gasket 57 are comprised of a treated graphite in a flexible base commercially available from Union Carbide Corp. under the trademark Grafoil. Important to note in connection with this construction is that in the open position of FIG. 9 the diaphragm stack is engaged by the entire cantilevered surface of flexible flange 60 and only partially, if at all, by flange 62 whereas in the closed position of FIG. 10 the opposite applies. In this arrangement, it should likewise be noted that in the valve open position of FIG. 9 the underside of the stack engages only the partial top surface of pad support 58 while when in the closed position of FIG. 10, it engages the entire pad surface including innermost lip 59 serving to increase supporting resilience in moving from the former to the latter.

The flexibility afforded by flanges 60 and 62 is selected to match stack properties such that throughout the cantilevered span of the flanges the contact support backing pressure decreases non-abruptly in a continuously decreasing manner. When reaching ultimate engagement at the flange tips, a minimum backing pressure exists thereat yet, being flexible, it cannot apply sharp or hard discontinuous loadings to the stack. Pad 58 functions similarly but as both a seal and a support pad allowing compressing deflections occurring when the valve is in its lowermost stroke position to be absorbed in the lower diaphragm elements just inside the clamp joint. To preclude or minimize locally increased foundation support stresses between the diaphragm and the flexible region of either flanges 60 or 62, slots 50 are provided in the uppermost diaphragm layers 46. The slots enable those layers to act more as a load distribution pad by functioning as an array of simple beams or cables to withstand only simple beam stresses rather than concurrent normal circumferential shell stresses. In this manner, the most critically located and failure susceptible diaphragm elements are rendered better able to withstanding greater loading and cycling conditions from a more uniform distribution of the foundation edge loading effects in a radial direction generally parallel to the slots.

Figure 14:
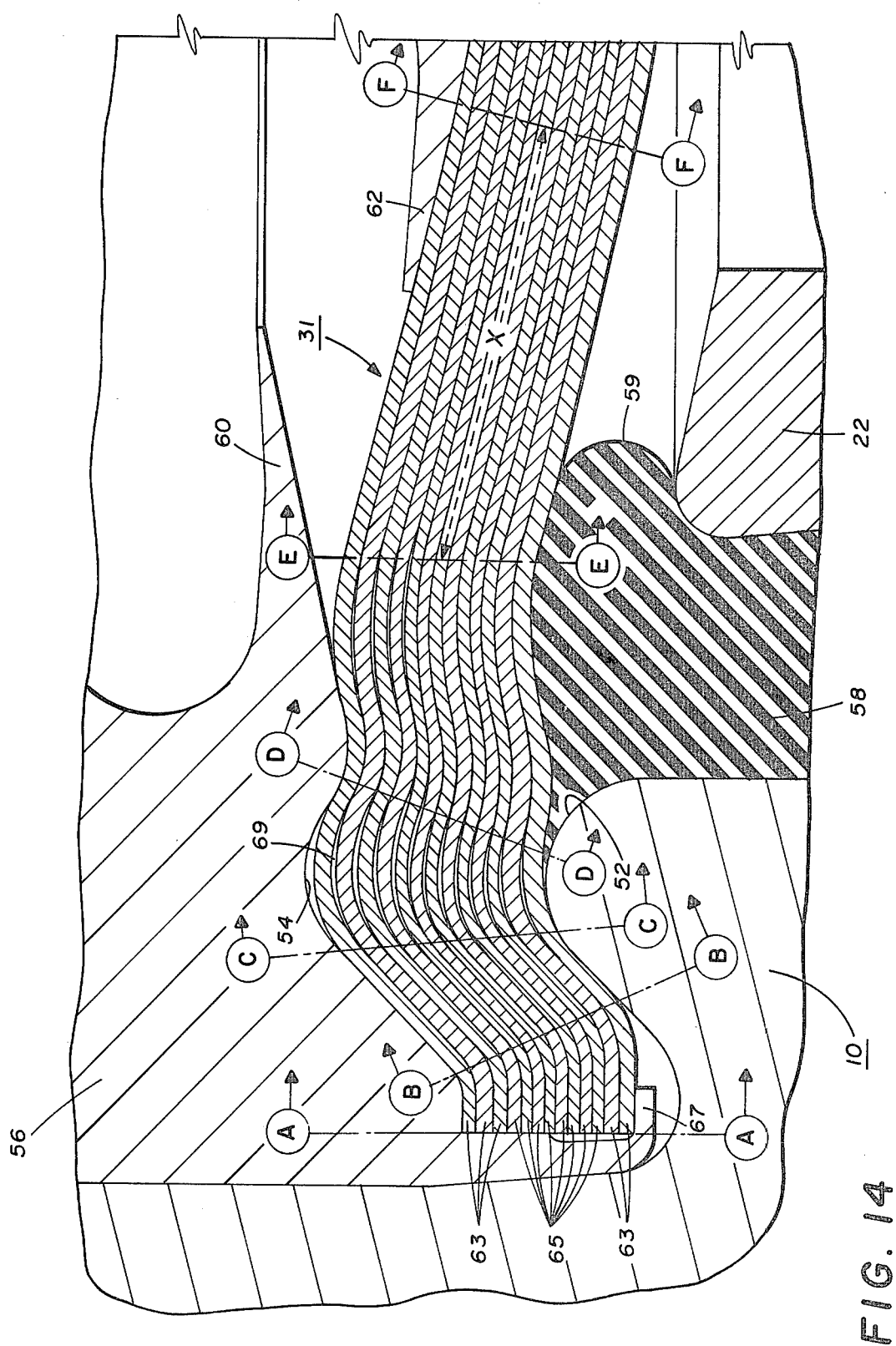
FIG. 14 is a fragmentary sectional enlargement similar to FIG. 10 for an alternate diaphragm embodiment.

The diaphragm in accordance with an alternate embodiment is designated 31 and will now be described with specific reference to FIG. 14. Forming the diaphragm cartridge of this embodiment are a plurality of superimposed layers 63 and 65 that are similarly prepacked and dry lubricated with molybdenum disulphide or the like to permit some sliding movement therebetween. Each of layers 63 and 65 consists of a like metal composition preferably the less expensive Inconel 718 described supra with layers 63 being between about 0.009 to 0.012 inches thick, usually about 0.010 inches, while layers 65 are between about 0.005 to 0.008 inches thick, usually about 0.0075 inches. By placing layers 63 with the about one-third greater thickness in both the top three and bottom two cartridge positions, the greater buckling tendency incurred thereat is more readily resisted as compared with the relatively thinner intermediate layer 65 at which exposure to buckling is minimal. The top layers 63 preferably include slots 50 in the manner of FIG. 12 for greater flexure while the third layer is unslotted.

For securing diaphragm cartridge 31 in a manner affording maximum control over buckling, various controlled clamping and containment arrangements are employed. It can be seen that the peripheral edges of the individual layers generally align in a vertical direction as represented by section line A—A where they are horizontally clamped between groove 54 and the inside face of lower flange 67. Radially inward therefrom the diaphragm bends upward between section lines B—B and C—C over the distance of which it remains clamped between the opposing surfaces of body tongue 52 and groove 54. From that point inward the diaphragm in the reverse curve thereat is contained but not clamped to past the position of section line D—D over a distance wherein minor separations 69 can occur between adjacent layers.

With further inward support being provided between flange 60 and base 59, a distance "X" is defined in the plane of the diaphragm layers between section lines E—E and F—F. Within distance "X" the pressurized stack in the shut or near shut position of the valve can deform or pop through from a compressive loading to a more stable tensile load condition. Since this action can occur without constraint at E—E, the formation of buckling ribs thereat is avoided. In this manner, the inner portion of the reverse curve between C—C and D—D is able to absorb the small and momentary radial swelling as occurs when distance "X" incurs its pop through reversal from the compressive to tension stressed condition.

The packing gland construction in accordance herewith will now be described with reference again to FIG. 1. In this arrangement, gland 38 functions as both a packing gland and a thread bushing, the later of which transfers the lift forces of stem 36 to valve bonnet 17. In its packing capacity, gland 38 is threadedly connected at 64 internally of the bonnet to compress several layers or a continuous sleeve 66 of packing 40 supported between graphite fiber rings 68. Packing 40 preferably comprises a Grafoil composition as described above for pad 58. As a bushing, gland 38 is threaded at 72 for supporting threaded stem 36 which can be rotatably advanced on the gland threads in either direction for operation of valve stem disc 20. By gland threads 64 and 72 having the same lead in the same direction, the gland can be tightened against the packing without moving the stem whether the valve is seated or backseated. Set screw 44 extending inward of gland slots (not shown) secures the position of gland 38 after the packing has been appropriately compressed. Should the occasion arise for removing the packing, it can be readily accomplished by threading gland 38 outwardly without otherwise disturbing the valve. With a durable quality packing such as Grafoil supra, usable life expectancy of the packing usually exceeds that of plant equipment rendering the need to retighten seldom, if ever, necessary. Likewise, with this material, the need to remove stem packing is so rare that use of this improved and simplified bonnet construction is more than acceptable. By virtue of the simplicity afforded in this arrangement, bonnet 17 can be readily formed of relatively inexpensive bar stock material thereby eliminating the prior requirements for bolts, nuts, flanges and yoke previously utilized in such valves.

With reference to FIGS. 1-8 and 13, features for improving flow characteristics of the valve will now be described. As in all valves of this basic type, flow entering passage 12 through inlet 14 flows past open seat 18 toward outlet 16. By virtue of the small lift associated with a diaphragm valve dictated by deflection properties of the diaphragm, flow enters the seat flow annulus permitting a substantial portion (about 75%) of the flow to proceed generally upward. At that point the upper flow normally bends 90° toward the outlet to circulate about guide 22 into a beltway flow path before merging downstream with remaining flow which moves past the annulus directly downstream.

To offset the bend losses and thereby enhance the flow coefficient in accordance herewith, there is provided a combination of an auxiliary porting relief with a tapered and faired beltway. Comprising the auxiliary porting relief are separate apertures 78 and 80 openly communicating on their undersides with passage 12 (FIG. 2). The axis of the apertures are arranged diverging from each other in a common plane, which is shown at 82 angularly offset from the axis of passage 12. Inlet to the relief apertures is located slightly above passage 12 immediately contiguous to the upper portion of guide 22 about where the sharp bend in flow has previously occurred. By virtue of the bend elimination, which the relief apertures provide, the flow pattern therethrough is more nearly streamlined in the manner specifically illustrated in FIG. 7. With this construction, therefore, the porting relief creates a more direct route or shortcut for the fluid as it rises in the valve cavity and begins its turn downstream toward outlet 16. Since the flow pattern is more direct and less inclined without the previous offset, a larger percentage of flow is able to enter the upper half of the downstream port resulting in a more gradual and average bend to enhance flow distribution and reduce pressure drop thereat.

For insuring most efficient use of the auxiliary relief ports 78 and 80, there is provided in combination therewith a varying thickness beltway flow path at the location designated 84 (FIG. 8) extending about the uppermost circumference of guide 22. Forming the beltway is the passage area between the inside eccentric wall surface 77 above concentric wall surface 74 of the valve body and the outside surface of guide 22. Both the wall surface and guide surface are appropriately contoured with the latter terminating as a teardrop 86 merging into the axis of passage 12. Teardrop 86 also serves to minimize possibility of cavitation from forming and helps to more efficiently orient the flow with a minimum, if any, turbulence. Thickness of the flow belt increases at this location from the upstream side of the beltway to uniformly and efficiently collect the seat flow without sudden enlargements or sharp changes in flow direction. From that point, the beltway directs flow toward and through the auxiliary porting relief apertures 78 and 80. For valve sizes 1 inch and smaller, use of the relief apertures and tapered beltway are relatively unnecessary and are therefore shown eliminated from FIGS. 5 and 6.

Figure 13:
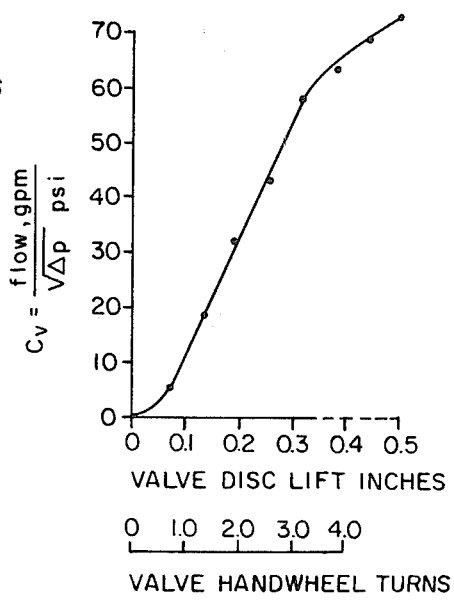
FIG. 13 is a graphical representation of valve performance with the construction hereof.

Effects of the foregoing can be readily appreciated from the graphical illustration of FIG. 13 in which for a 2-inch diaphragm valve with ⅜ inch lift the flow coefficient Cv is enabled to increase at full open to 60 and beyond. This compares to a Cv of about 37 for the same valve without the auxiliary relief and beltway formation hereof. At the same time, a relatively linear throttling curve is maintained such that it can be readily utilized to set and control systems for partial load operation.

By the above description there is disclosed novel improvements for enhancing operation and diaphragm life expectancy of a high pressure, high temperature Y-pattern diaphragm valve. Through use of a novel construction for both the diaphragm and its support, life expectancy of the diaphragm is significantly extended as compared to previous designs. Forming the diaphragm of superimposed layers of controlled thicknesses and as in one embodiment of selectively different materials, in combination with a support which functions when the valve is in its lowermost position to allow compressive deflections of the diaphragm to be absorbed inside the clamped joint, substantially overcomes the previous stress caused by buckling, creasing and/or fatigue failure. In an alternate embodiment, a similar diaphragm result is obtained by use of varying thickness stack layers in combination with a clamping and containment arrangement of the stack affording a predetermined control over buckling. Yet, further, an auxiliary relief and flow feathering construction substantially enhances the flow coefficients for such valves as compared to similar purpose valves of the prior art.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a diaphragm type valve including a valve body, a flow passage defined in said body between an inlet and an outlet, a valve seat defined in said passage, a closure disc adapted to cooperate with said seat for opening and closing said passage to fluid flow, a bonnet secured to said body and a stem extending through a bore in said bonnet for operatively moving said closure disc relatively toward and away from said seat, diaphragm means for maintaining a seal-tight relation between said passage and said stem and comprising:
   (a) a multi-layer flexible stack of load bearing independent metal layers positioned in said body intervening between said closure disc and said stem effecting separation thereof with some of said layers being of a different metal composition than others of said layers; and
   (b) support means securing said stack in seal-tight relation to said body.

2. In a diaphragm type valve according to claim 1 in which selectively adjacent of said layers alternate between said different metal compositions.

3. In a diaphragm type valve according to claim 2 in which one of said layer compositions comprises a metal having a significantly higher modulus of elasticity than the metal of said other composition.

4. In a diaphragm type valve according to claim 3 in which said support means includes clamping means securing said layers at their periphery and a resilient base inboard of said clamping means for at least partially supporting said stack in the closed position of said closure disc.

5. In a diaphragm type valve according to claim 4 in which said clamping means is effective to secure said stack in a reverse curve clamping engagement extending annularly juxtaposed to the circumference of said stack.

6. In a diaphragm type valve according to claim 4 in which said clamping means includes a first flexible annular flange cantilevered overlying said resilient base and adapted to fully engage the topside of said stack uniformly when said closure disc is in the open position of said passage and to partially engage the topside of said stack when said closure disc is in the closed position of said passage.

7. In a diaphragm type valve according to claim 6 also including a second flexible annular flanged adapted to fully engage the topside of said stack when said closure disc is in the closed position of said passage and to partially engage the topside of said stack when said closure disc is in the open position of said passage.

8. In a diaphragm type valve according to claim 7 in which said second flange extends integrally about the head of said stem.

9. In a diaphragm type valve according to claim 4 in which at least the uppermost layer but less than all the layers of said stack includes a surface variation effective to redistribute operative stresses inwardly away from the circumference thereof.

10. In a diaphragm type valve according to claim 9 in which said surface variation comprises a plurality of slots extending in a substantially radial direction uniformly displaced about the surface thereof.

11. In a diaphragm type valve according to claim 1, including gland means between said stem and said bonnet effective both as a packing gland to maintain a packing seal about said stem and as a thread bushing for transferring stem lift forces to said bonnet.

12. In a diaphragm type valve according to claim 11 in which said gland means is tubular and includes threads on its outside surface for threaded engagement with said bonnet and includes threads on its inside surface for threaded engagement with said stem.

13. In a diaphragm type valve according to claim 12 in which both said outside threads and said inside threads have substantially the same pitch.

14. In a diaphragm type valve including a valve body, a flow passage defined in said body between an inlet and an outlet, a valve seat defined in said passage, a closure disc adapted to cooperate with said seat for opening and closing said passage to fluid flow, a bonnet secured to said body and a stem extending through a bore in said bonnet for operatively moving said closure disc relatively toward and away from said seat, diaphragm means for maintaining a seal-tight relation between said passage and said stem and comprising:
   (a) a multi-layer flexible stack of load bearing independent metal layers positioned in said body intervening between said closure disc and said stem effecting separation thereof with some of said layers being of a different thickness than others of said layers; and
   (b) support means securing said stack in seal-tight relation to said body.

15. In a diaphragm type valve according to claim 14 in which substantially all of said layers are of like composition.

16. In a diaphragm type valve according to claim 15 in which at least the uppermost and lowermost layers are of a thickness generally greater than the intermediate layers therebetween.

17. In a diaphragm type valve according to claim 16 in which the thicker of said layers has a thickness generally about one-third greater than the thinner of said layers.

18. In a diaphragm type valve according to claim 17 in which said support means includes clamping means securing said layers about their periphery and containment means juxtaposed radially inward from said clamping means containing said layers in an unclamped relation.

19. In a diaphragm type valve according to claim 18 in which said support means includes a resilient base radially inboard of said containment means, a first flexible annular flange cantilevered overlying said resilient base and adapted to fully engage the topside of said stack uniformly when said closure disc is in the open position of said passage and to partially engage the topside of said stack when said closure disc is in the closed position of said passage.

20. In a diaphragm type valve according to claim 19 also including a second flexible annular flange adapted to fully engage the topside of said stack when said closure disc is in the closed position of said passage and to partially engage the topside of said stack when said closure disc is in the open position of said passage.

21. In a diaphragm type valve according to claim 20 in which said second flange extends integrally about the head of said stem.

22. In a diaphragm type valve according to claim 18 in which at least the uppermost layer but less than all the layers of said stack includes a surface variation effective to redistribute operative stresses inwardly away from the circumference thereof.

23. In a diaphragm type valve according to claim 22 in which said surface variation comprises a plurality of slots extending in a substantially radial direction uniformly displaced about the surface thereof.

24. In a diaphragm type valve of Y-pattern configuration including a valve body, an inlet and outlet arranged coaxially aligned on opposite ends of said body and defining a flow passage therebetween, an operating stem arranged with its axis obliquely extending to said inlet and outlet alignment, a diaphragm isolating said stem from the flow passage of said body, a valve seat defined in said passage coaxially aligned with said stem and a closure disc coaxially aligned with said stem and operable by said stem for cooperating with said seat for opening and closing said passage to fluid flow, auxiliary passage means defined in said body intervening in the flow path between said disc and said outlet effecting a relatively straight line flow path direction extending from about said disc to said outlet for that portion of flow passing inward through said seat in a direction approximately parallel to said stem axis to a location generally beyond the dimensional limits of said flow passage thereat and then about said disc in said open position as compared to a direction of flow path therefor it extending from about said disc at said location directly to said outlet.

25. In a diaphragm type valve according to claim 24 in which said auxiliary passage means includes at least a pair of spaced apart ports communicating with said passage downstream from said closure disc from a location in said passage proximately close to said closure disc.

26. In a diaphragm type valve according to claim 25 in which said pair of ports are on axes angularly offset from the axis of said downstream passage.

27. In a diaphragm type valve according to claim 26 in which the axes of said ports are in a common plane with respect to the axis of said downstream passage but are angularly divergent with respect to each other.

28. In a diaphragm type valve according to claim 26 in which the axes of said ports effectively locates the outlet of said ports closer to the axis of said downstream passage than the inlet of said ports.

29. In a diaphragm type valve according to claim 28 further including a beltway of gradually increasing flow area defined in said flow passage about the upstream toward the downstream portion of said disc.

30. In a diaphragm type valve according to claim 24 further including a beltway of gradually increasing flow area defined in said flow passage about the upstream toward the downstream portion of said disc.

31. In a diaphragm type valve including a valve body, a flow passage defined in said body between an inlet and an outlet, a valve seat defined in said passage, a closure disc adapted to cooperate with said seat for opening and closing said passage to fluid flow, a bonnet secured to said body and a stem extending through a bore in said bonnet for operatively moving said closure disc relatively toward and away from said seat, diaphragm means for maintaining a seal-tight relation between said passage and said stem and comprising:
  (a) a multi-layer flexible stack of load bearing independent metal layers positioned in said body intervening between said closure disc and said stem effecting separation thereof; and
  (b) support means securing said stack in seal-tight relation to said body and comprising clamping means securing said layers about their periphery, containment means juxtaposed radially inward from said clamping means containing said layers in an unclamped relation, a resilient base radially inboard of said containment means, and a first flexible annular flange cantilevered overlying said resilient base and adapted to fully engage the topside of said stack uniformly when said closure disc is in the open position of said passage and to partially engage the topside of said stack when said closure disc is in the closed position of said passage.

32. In a diaphragm type valve according to claim 31 also including a second flexible annular flange adapted to fully engage the topside of said stack when said closure disc is in the closed position of said passage and to partially engage the topside of said stack when said closure disc is in the open position of said passage.

33. In a diaphragm type valve according to claim 32 in which said second flange extends integrally about the head of said stem.

34. In a diaphragm type valve according to claim 31 in which at least the uppermost layer but less than all the layers of said stack includes a surface variation effective to redistribute operative stresses inwardly away from the circumference thereof.

35. In a diaphragm type valve according to claim 34 in which said surface variation comprises a plurality of slots extending in a substantially radial direction uniformly displaced about the surface thereof.

* * * * *